Oct. 3, 1967 F. ZANKL 3,344,713
DRIVE MECHANISM FOR ACTUATING A MOVABLE MACHINE MEMBER
Filed Aug. 9, 1965
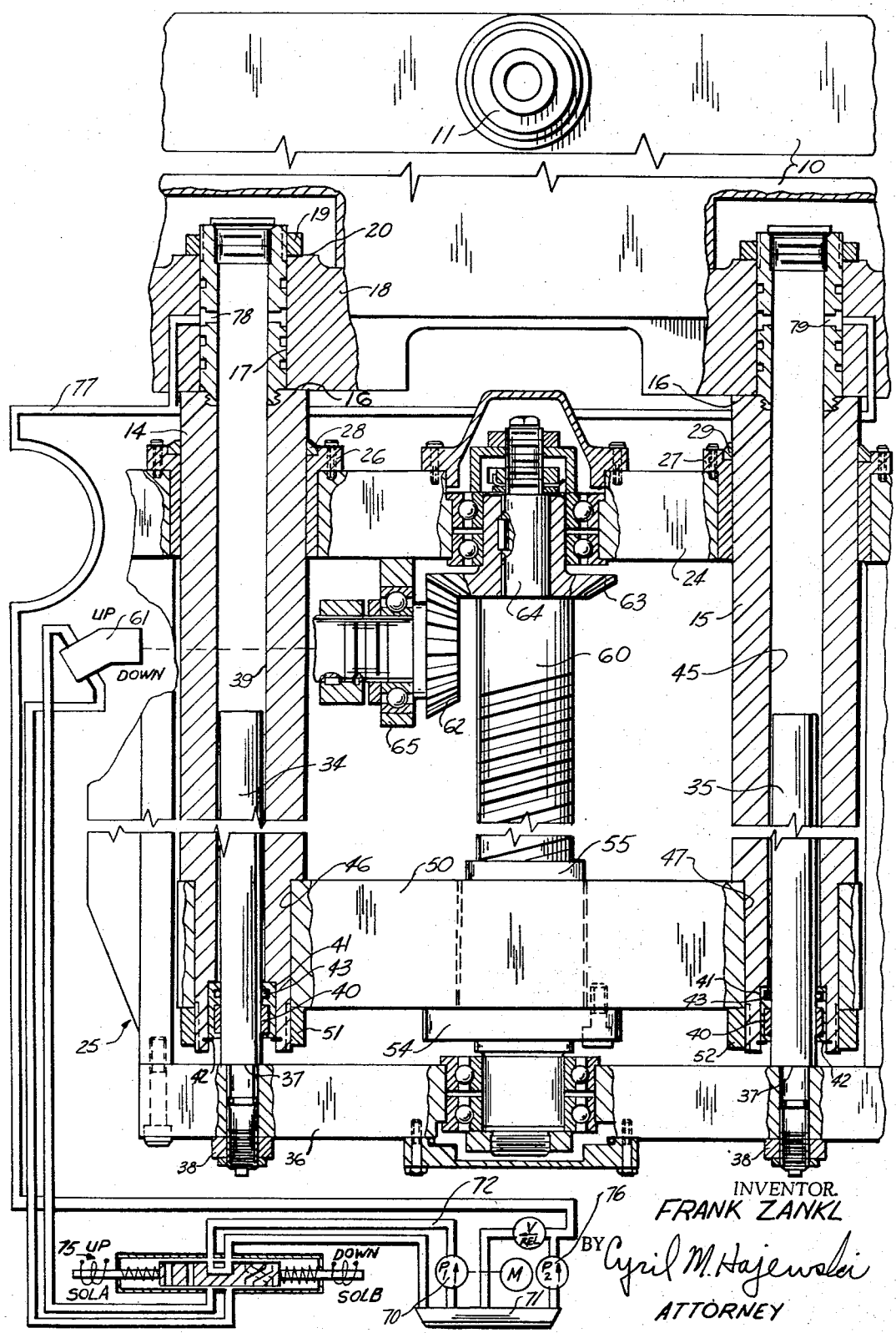
INVENTOR.
FRANK ZANKL
BY Cyril M. Hajewski
ATTORNEY

United States Patent Office 3,344,713
Patented Oct. 3, 1967

3,344,713
DRIVE MECHANISM FOR ACTUATING A
MOVABLE MACHINE MEMBER
Frank Zankl, Milwaukee, Wis., assignor to Kearney &
Trecker Corporation, West Allis, Wis., a corporation
of Wisconsin
Filed Aug. 9, 1965, Ser. No. 478,290
6 Claims. (Cl. 90—16)

ABSTRACT OF THE DISCLOSURE

A machine tool structural arrangement in which the drive mechanism for raising and lowering the spindle head is enclosed within the bed of the machine with the drive being transmitted to the spindle head by a pair of posts. The posts extend into the bed and are connected therein to the drive mechanism. The opposite ends of the posts are connected to the spindle head so that as the posts are axially moved by the drive mechanism into and out of the bed, the spindle head moves with them in the desired path of travel. Wiper members wipe dirt off of the surface of the posts as they enter into the bed during the downward movement of the spindle head.

---

It is conventional practice to employ a screw and nut drive mechanism for actuating the movable elements of a machine tool. Either the nut or the screw are mounted on the movable element and the other member is mounted on the machine frame. Relative rotation between the screw and nut then produces the desired movement of the movable machine element. Screw and nut drive mechanisms are particularly suitable for these applications because they can be adapted to produce the precision movements required of movable machine tool members. However, in order to maintain the desired accuracy and prevent excessive wear and damage to the screw and nut drive mechanism it is essential that it be kept clean. A machining operation usually produces a substantial amount of dust and machining chips. In many applications, the screw and nut drive mechanism is located where it would be exposed to such dirt and it is imperative that the drive mechanism be adequately protected from it.

A variety of protective devices have been developed for this purpose but they have certain inherent deficiencies. For example, it has been the practice to locate the nut in a position where it is protected from the machining chips and dust and enclose the screw in a folding bellows that expands and contracts with the movement of the movable machine tool member. However, such bellows may be readily torn or otherwise damaged to the extent that they fail to provide the desired protection. Telescoping plates or sleeves are also utilized to cover the drive mechanism but such structure may be seriously damaged by the dropping of a workpiece, tool, or the like, upon its surface.

The present invention overcomes these difficulties by completely containing the screw and nut drive mechanism within an enclosure found in the machine tool structure, as for example, within the bed of a bed type machine tool. Within this enclosure, the drive mechanism is fully protected from dirt as well as from accidental damage. The drive mechanism is coupled to the movable member of the machine by a connector element which has one end connected to the drive mechanism to be driven thereby in a rectilinear path and extends therefrom out of the enclosure into engagement with the movable member so that the latter will move in unison with the connector element in response to the operation of the screw and nut mechanism.

The connector element passes through a suitable opening formed in one wall of the enclosure. A wiper is mounted about this opening to wipe the surface of the connector element while it is moving so that any foreign matter that may adhere to the surface of the connector element is wiped off before the surface moves to the confines of the enclosure to exclude the foreign matter from the enclosure. Thus, the screw and nut drive mechanism is always disposed within the protective confines of the enclosure. Moreover, the movable connector element, which extends outwardly of the enclosure, is provided with a smooth surface which can be easily wiped clean before it is moved into the enclosure in response to the operation of the drive mechanism.

The foregoing and other objects of this invention, which will become more fully apparent from the following detaied description, may be achieved by the exemplifying apparatus depicted and set forth in the specification in connection with the accompanying drawing.

The drawing is a view partly in elevation and partly in vertical section illustrating a feed drive mechanism incorporating the features of the present invention.

Reference is now made more particularly to the drawing which illustrates a feed drive mechanism incorporating the features of the present invention and illustrated as being connected to actuate a movable spindle head 10 of a machine tool. The spindle head 10 is mounted on a frame (not shown) of a machine tool for movement in a vertical path of travel to selectively position a cutting tool (not shown) carried by a spindle 11 that is journaled in the head 10. A pair of tubular posts 14 and 15 are attached to the spindle head 10 and depend therefrom in spaced relationship. The upper portion of the post 14 is of a reduced diameter to form a shoulder 16 which abuts the bottom surface of the spindle head 10 with the reduced diameter portion of the post 14 extending through a bore 17 formed in an extension 18 of the spindle head 10. The upper extremity of the reduced diameter portion of the post 14 is threaded to receive a nut 19 that is tightened against the top surface 20 of the extension 18 for rigidly securing the post 14 to the spindle head 10. The tubular post 15 is likewise attached to the spindle head 10 in identical manner.

The posts 14 and 15 extend downwardly from the spindle head 10 through an upper plate 24 of a stationary machine tool bed that is adapted in well-known manner to support a workpiece (not shown). The posts 14 and 15 extend downwardly through the top plate 24 which also serves as the top wall of an enclosure generally identified by the reference numeral 25. Since the posts 14 and 15 are attached to the spindle head 10 they move therewith relative to the top plate 24 and are therefore disposed within bearings 26 and 27, respectively, that are mounted in the top plate 24 for slidably receiving the posts 14 and 15. The bearing 26 includes a wiper member 28 that embraces the periphery of the post 14, and as the post 14 moves in its path of travel, the wiper 28 wipes off any foreign matter that may be deposited upon the periphery of the post 14. In like manner, the bearing 27 includes a wiper member 29 that firmly embraces the periphery of the tubular post 15 for wiping its surface clean as it moves into the enclosure 25.

A pair of shafts 34 and 35 extend upwardly from a bottom plate 36 of the enclosure 25 for guiding the lowermost portions of the posts 14 and 15, respectively. The shaft 34 includes a reduced diameter portion forming a shoulder 37 that rests upon the top surface of the plate 36. The lower extremity of the reduced diameter portion of the shaft 34 is provided with a thread for receiving a nut 38 that is tightened against the bottom surface of the plate 36 for rigidly securing the shaft 34 thereto. The shaft 34 extends upwardly from the plate 36 into a concentric bore 39 of the tubular post 14. A thrust bearing 40 is mounted in a bearing bracket 41 that is secured within the inner bore of the post 14 by a snap ring 42 so that the bracket will move with the post 14 in its vertical path of travel relative to the guide shaft 34. The thrust bearing 40 permits the post 14 to move freely relative to the shaft 34 and a seal 43 is mounted in the bearing bracket 41 to engage the periphery of the shaft 34 for preventing the seepage of hydraulic fluid out of the bore 39. In identical manner, the guide shaft 35 extends into a bore 45 of the post 15 and includes the identical elements that are associated with the shaft 34. Accordingly, identical parts are identified by the same reference numerals in the drawing.

The lower extremities of the posts 14 and 15 are of a reduced diameter for insertion into bores 46 and 47, respectively, which are formed in opposite ends of a bracket 50. The end of the post 14 is threaded for receiving a nut 51 which is tightened against the bottom surface of the bracket 50 to secure the latter to the post 14. In like manner, the end of the post 15 is threaded in engagement with a nut 52 that is tightened against the bottom of the bracket 50 for also securing the latter to the post 15. It is therefore apparent that the bottom portions of the two posts 14 and 15 are rigidly secured to the bracket 50 for movement in unison therewith. A nut 55 is provided with an integral flange 54 that is secured to the bracket 50 by suitable screws to rigidly attach the nut 55 to the bracket 50. The nut 55 is in threaded engagement with a screw 60 that has its upper end journaled in the top plate 24 and its lower end journaled in the bottom plate 36. The screw 60 is thereby rotatably supported in a vertical plane within the enclosure 25 and rotation of the screw 60 in either direction will cause movement of its cooperating nut 55 in either an upward or downward direction depending upon the direction of rotation. Since the nut 55 is rigidly secured to the bracket 50, the latter will move with the nut in the upward or downward direction with the posts 14 and 15 moving in unison therewith by reason of their connection to the bracket 50. Since the upper portions of the posts 14 and 15 are secured to the spindle head 10, the latter will likewise move in its vertical path of travel with the posts 14 and 15 for moving the spindle 11 in the desired manner.

Rotation of the screw 60 is obtained by energizing a motor 61 that is connected to drive a bevel gear 62 which is rotatably supported by a bracket 65 that is mounted on the underside of the plate 24. The bevel gear 62 is in meshing engagement with a complementary bevel gear 63 that is keyed to a reduced diameter upper portion 64 of the screw 60 so that the bevel gear 63 and the screw 60 rotate together. Accordingly, as the motor 61 is energized, the drive is transmitted through the bevel gears 62 and 63 for rotating the screw 60 to move the nut 55 in a vertical direction. The motor 61, of course, is reversible for rotating the screw 60 in either direction so that the nut 55 and thereby the spindle head 10 may likewise be moved either in an upward or downward direction as desired.

As a result of the above arrangement, the nut 55 and its cooperating screw 60 are always completely enclosed within the enclosure 25 and only the peripheral surfaces of the posts 14 and 15 are exposed during the operation of the machine. However, during movement of the posts 14 and 15, their peripheral surfaces are cleaned by the wipers 28 and 29, respectively, so that any dirt that may have adhered to the surface of the posts 14 and 15 is wiped away before the surface enters the enclosure 25 during the downward movement of the spindle head 10. As a cutter contained in the spindle 11 operates on a workpiece, the chips will fall on top of the top plate 24 of the machine tool bed but cannot enter into the sealed enclosure 25 so that the nut 55 and its cooperating screw 60 are always completely protected from the dust and debris that normally accompanies a machining operation. If desired, the enclosure 25 may be filled with oil to immerse the nut 55 and the screw 60 therein, or the oil may be pumped onto the screw 60 within the enclosure 25 and the possibility of contaminating the oil is reduced to an absolute minimum.

The motor 61 is depicted as a hydraulic motor energized by hydraulic pressure developed by a pump 70 which pumps hydraulic fluid from a sump 71 into a conduit 72. The latter directs the hydraulic pressure to a control valve 75 which regulates the flow of hydraulic pressure to the motor 61.

A separate pump 76 is provided for pumping hydraulic fluid from the sump 71 into a conduit 77 that is in communication with the chambers formed by the bores 39 and 45 of the posts 14 and 15, respectively, through ports 78 and 79. The hydraulic pressure in the bores 39 and 45 serves to counterbalance the weight of the spindle head 10 in order to equalize the load on the motor 61. The counterbalancing effect is obtained in the bore 39 by the hydraulic pressure reacting against the closed top of the post 14 and the top end of the stationary shaft 34. The lifting effect against the top of the post 14 cooperates with a similar lifting effect produced by the hydraulic pressure in the bore 45 reacting against the closed top of the post 15 and the top end of the stationary shaft 35. Thus, the hydraulic pressure in the bores 39 and 45 functions to counterbalance the weight of the movable spindle head 10.

From the foregoing detailed description of the illustrative embodiment set forth herein to exemplify the present invention, it will be apparent that there has been provided an improved feed drive mechanism for a movable element of a machine tool in which maximum protection is provided to the drive mechanism for increasing its life expectancy and maintaining its accuracy through a much longer period of use.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, I hereby claim as my invention:

1. In a feed drive mechanism for driving a movable member of a machine having a bed and in which the movable member is disposed in spaced relationship with said bed and is movable toward and away from the bed:
    an enclosure formed in said bed, said enclosure excluding from its interior the dust and debris that may be present about the exterior of the machine;
    drive means in said enclosure;
    a driven element within said enclosure connected to said drive means to be driven thereby in a rectilinear path within said enclosure;
    coupling means connected to said driven element within said bed for movement therewith relative to said enclosure, said coupling means extending outwardly of said bed into engagement with the movable member so that the latter will move in its path of travel with said driven element; and,
    operating means for operating said drive means within said enclosure.

2. A feed drive mechanism according to claim 1 wherein said drive means is a screw and nut mechanism fully contained within said enclosure in said bed including:
    a screw rotatably supported within said enclosure and connected to be rotated by said operating means; and, a nut in threaded engagement with said screw and fixed against rotation so that it is moved along said screw as the latter is rotated.

3. A feed drive mechanism according to claim 2 wherein said driven element is a bracket secured to said nut for movement in unison therewith.

4. A feed drive mechanism according to claim 3 wherein said coupling means comprises a post connected at one end to said bracket for movement in unison therewith and extending therefrom outwardly of said enclosure into engagement with the movable member so that the latter will move in its path of travel with the movement of said post.

5. A feed drive mechanism according to claim 4 including a wiper mounted in position to wipe the surface of said post as it moves into and out of said enclosure so that any dirt that adheres to the surface of said post as it is exposed outside of said enclosure will be wiped off by said wiper to prevent it from entering into said enclosure.

6. A feed drive mechanism according to claim 4 wherein said post is provided with a bore closed at the end of the post that is connected to said movable member and including a shaft rigidly secured to the stationary machine structure, the end of said post opposite its connection to said movable member encompassing said shaft; and, a source of hydraulic pressure in communication with the bore of said post to react against the top of said stationary shaft and the closed end of the bore for counterbalancing the movable member.

References Cited
UNITED STATES PATENTS

| | | | |
|---|---|---|---|
| 2,201,934 | 5/1940 | Turrettini | 77—36 |
| 2,338,624 | 1/1944 | Curtis | 90—58 |
| 3,018,697 | 1/1962 | Schroeder et al. | 90—16 |

WILLIAM W. DYER, Jr., *Primary Examiner.*

LEONIDAS VLACHOS, *Examiner.*